2,716,709

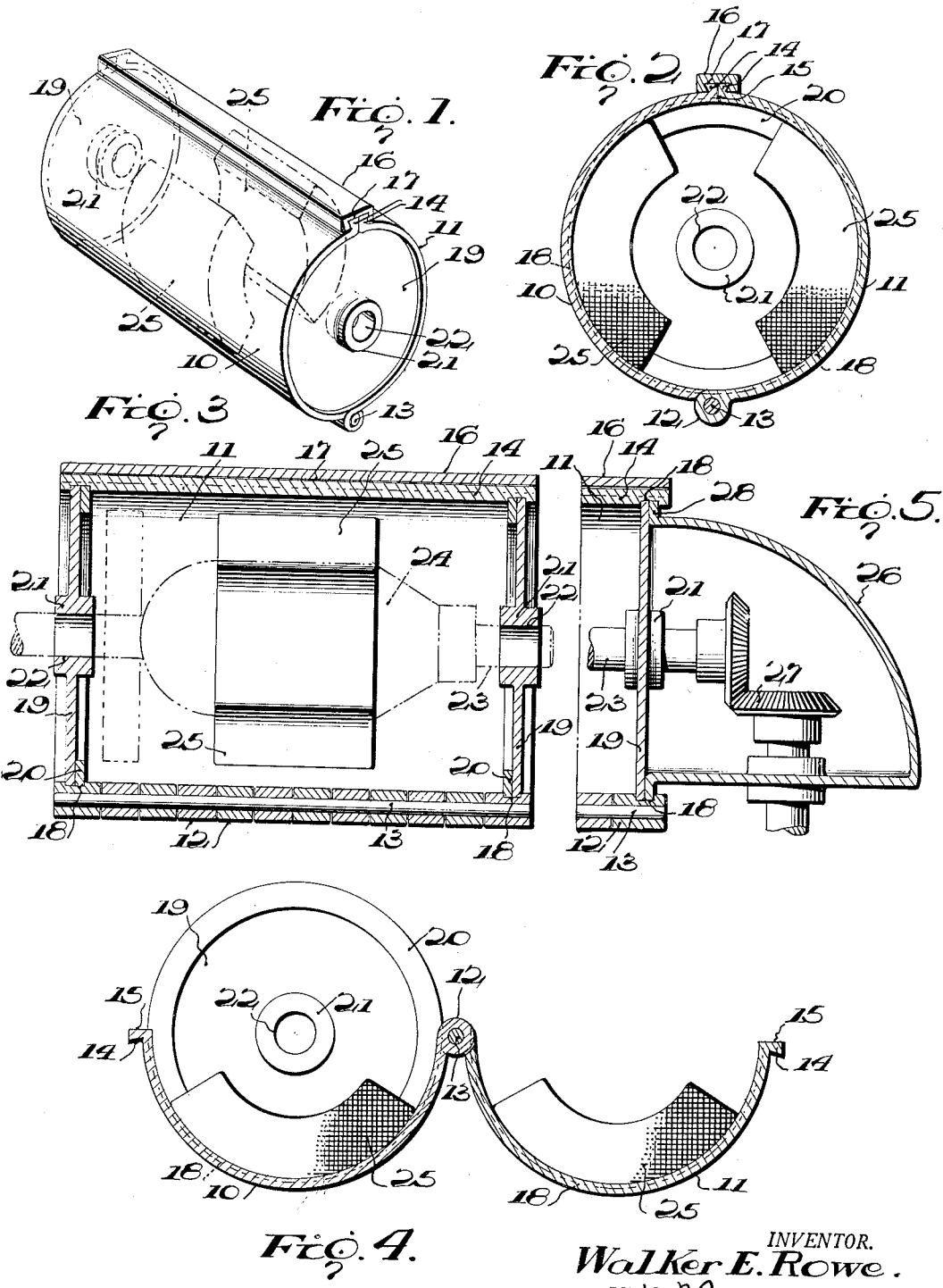

CASINGS FOR ELECTRIC MOTORS, GENERATORS, AND THE LIKE

Walker Eliott Rowe, Georgetown, S. C.

Application July 31, 1953, Serial No. 371,454

6 Claims. (Cl. 310—254)

My invention relates to improvements in casings for electric motors, generators, and the like.

A primary object of the invention is to provide a rugged and simplified casing for electric motors, generators and the like, formed of a pair of hingedly connected casing sections and readily detachable end plates, adapted to serve as bearings for the motor armature shaft, or the like.

A further object is to provide novel and simplified means for releasably securing the casing sections together firmly in assembly with the end plates.

A further object is to provide a split casing of the above mentioned character which may have the stator windings of the motor or generator secured to the inner faces of the hinged casing sections.

A still further object of the invention is to provide in a casing of the above mentioned character means for attaching a gear box or other special end attachment to the same.

Other objects and advantages of the invention will be apparent during the course of the following description.

In the accompanying drawings, forming a part of this application, and in which like numerals are employed to designate like parts throughout the same, Figure 1 is a perspective view of a casing for motors, generators, and the like, embodying my invention, Figure 2 is a transverse vertical section through the same on an enlarged scale, Figure 3 is a central vertical longitudinal section through the casing showing a motor armature journaled therein, in broken lines, Figure 4 is a further transverse vertical section through the casing in the open position, and, Figure 5 is a fragmentary central vertical longitudinal section through the casing with an end gear box attached thereto.

In the drawings, where for the purpose of illustration is shown a preferred embodiment of the invention, the numerals 10 and 11 designate semi-cylindrical casing sections of any preferred length, which are open at their opposite ends. The casing sections 10 and 11 are provided at their corresponding longitudinal edges with inter-fitting contacting hinge knuckles 12, preferably formed integral therewith, and receiving a long longitudinal pintle or hinge pin 13, extending for the entire length of the casing, and serving to hingedly connect the casing sections, as shown.

The casing sections 10 and 11 are further provided adjacent to their other corresponding longitudinal edges with longitudinal dove-tailed extensions or flanges 14, integral therewith, extending for the entire length of the casing, and projecting radially beyond the peripehry thereof. The extensions 14 have flat meeting faces 15, Figure 2, which contact when the casing sections are in the closed position.

I provide an elongated locking bar or key 16, provided in one side with a dove-tailed groove 17, receiving the dove-tailed extensions 14 longitudinally, when the casing sections are brought together in opposed relation, as shown. The key 16 preferably extends for the entire length of the casing, although it may be somewhat shorter, if preferred. The key 16 preferably has a snug fit over the dove-tailed extensions 14, although it is readily removable therefrom.

The casing sections 10 and 11 are provided near and inwardly of their opposite ends, and in their inner faces with opposed annular grooves or recesses 18, extending about the entire circumference of the casing, when the same is closed, as shown in Figures 1 and 2.

Generally flat circular discs or end plates 19 are received by the grooves 18 of the casing sections, and are locked firmly therein, when the casing sections are in the closed position. The grooves 18 are preferably about twice as wide as the thickness of each end plate 19, for a reason to be explained hereafter. Spacer rings 20 are received by the grooves 18, inwardly of the end plates 19, and with the end plates fill up the grooves and preferably fit snugly therein, so that the end plates are firmly anchored and held stationary within the casing sections, when the latter are closed.

The end plates 19 are provided with central axially aligned bearing hubs 21, preferably integral therewith, and having axially aligned bores 22. The bores 22 are adapted to receive an armature shaft 23 of a motor or generator armature 24, as indicated in Figure 3, and to support the same for free rotation.

Arcuate stator coils or windings 25 are fixedly secured in any preferred manner to the inner faces of the casing sections 10 and 11, adjacent to the center of the armature or rotor 24 and these stator windings are bodily carried by the casing sections 10 and 11, and adapted to be closed about the rotor, in properly spaced relation thereto, when the casing sections are closed.

The above described arrangement may be utilized for various types of electrical equipment, such as large electric motors, generators, and the like, as well as for small portable motor casings of the type employed on portable electric drills and the like.

In Figure 5, I have shown my split motor casing provided with an end gear box 26, having a pair of bevel gears 27 mounted therein, for operating a desired mechanism or attachment from the armature shaft 23. The gear box 26 is provided at one end with an annular flange 28, integral therewith, engaging within one pair of the grooves 18 of casing sections 10 and 11. The flange 28 is disposed upon the outer side of the adjacent end plate 19, in contacting relation therewith, and with the end plate 19 fills up the grooves 18 of the casing sections 10 and 11. When the gear box 26 is applied to either end of the casing, the spacer ring 20 at such end is eliminated, and the annular flange 28 occupies the space normally taken up by the spacer ring. The flange 28 and end plate 19 preferably have a snug fit within the grooves 18 of the casing sections 10 and 11, and the gear box may be applied to either end of my motor casing, as found desirable. In lieu of the particular gear box 26 shown in Figure 5, I may utilize the parts of the grooves 18 at either end of the split casing for the mounting of other types of gear boxes or end attachments, as found desirable, and if preferred, my casing may be used without any end attachment, as shown in Figure 3, in which case both spacer rings 20 are employed. All other parts of the device shown in Figure 5 are identical with those shown in Figures 1 to 4 inclusive.

In use, the casing sections 10 and 11 are opened or separated, as shown in Figure 4, and the end plates 19 are assembled on to the armature shaft 23. The casing sections 10 and 11 are now closed about the armature 24 and end plates 19, with the end plates and spacer rings 20 arranged within the grooves 18 of one casing section, as shown in Figure 4. The key 16 is then applied longitudinally over the dove-tailed extensions 14, and the motor or generator is ready for operation. No separate bearings, other than the end plates 19 are needed, and assembly and dis-assembly of the motor is rendered quite simple by my improved casing construction.

It is to be understood that the form of the invention, herewith shown and described is to be taken as a preferred example of the same, and that various changes in the shape, size and arrangement of parts may be resorted to, without departing from the spirit of the invention or scope of the sub-joined claims.

Having thus described my invention, I claim:

1. A device of the character described comprising hingedly connected casing sections which are substantially semi-circular in cross section and having grooves formed in their inner faces near the ends of the casing sections, substantially circular end plates separate from the casing sections and engageable within the grooves when the casing sections are closed and having aligned bores to receive an armature shaft or the like, dove-tailed extensions carried by the casing sections adjacent to corresponding edges of the same, and a locking key having a dove-tailed groove formed therein for receiving said dove-tailed extensions and adapted to hold the casing sections closed about said end plates.

2. A device of the character described comprising a pair of substantially semi-cylindrical casing sections hingedly connected at corresponding longitudinal edges, the casing sections having circumferential grooves in their inner faces near corresponding ends of the same, substantially circular end plates engageable within the grooves when the casing sections are swung together in opposed relationship and having parts forming bearings for a motor shaft or the like, generally radial flanges secured to the casing sections adjacent to the other longitudinal edges thereof, and a bar having a longitudinal groove formed therein slideably receiving said flanges for locking the casing sections together about said end plates.

3. A casing for motors and the like comprising a pair of open ended substantially semi-cylindrical casing sections, hinge means connecting the casing sections near corresponding longitudinal edges of the same, stator windings secured to the inner faces of the casing sections, the casing sections having grooves in their inner faces outwardly of the stator windings, end plates separate from the casing sections engageable within said grooves, locking extensions secured to the casing sections near their other corresponding longitudinal edges, and a locking bar having a longitudinal groove formed therein receiving said locking extensions, said end plates having aligned bores for receiving the armature shaft of the motor or the like.

4. A device of the character described comprising open ended casing sections hingedly connected at corresponding sides and having internal grooves formed therein near their opposite ends, end plates engageable within the grooves of the casing sections and being thinner than the widths of the grooves, spacer elements disposed within the grooves with the end plates and holding the end plates against movement within the grooves, the end plates having aligned bores to receive a motor armature shaft or the like, and an element engageable with the casing sections when the same are closed about the end plates for releasably securing them together.

5. A device of the character described comprising a pair of open ended casing sections hingedly connected at corresponding sides and having grooves formed in their inner faces near the ends of the casing sections, end plates separate from the casing sections adapted to engage within the grooves of the casing sections when the same are swung together for inclosing said end plates, said end plates having aligned central bores for receiving a rotatable shaft or the like, and means connected with said casing sections at the other corresponding sides of the same for releasably securing them together about said end plates.

6. A device of the character described comprising a pair of open ended casing sections hingedly connected at corresponding sides, end plates separate from the casing sections and engageable between the casing sections near the ends of the casing sections when the casing sections are swung together for inclosing the end plates, the end plates having aligned central openings for receiving a rotatable shaft or the like, and detachable means connected with the other corresponding sides of the casing sections when they are closed together about said end plates for releasably locking the casing sections together.

References Cited in the file of this patent

UNITED STATES PATENTS

| | | |
|---|---|---|
| 505,783 | Ashley | Sept. 26, 1893 |
| 740,031 | McGaughey et al. | Sept. 29, 1903 |
| 1,497,734 | Ramoneda | June 17, 1924 |
| 1,531,488 | McNamara | Mar. 31, 1925 |
| 2,502,185 | Thomas | Mar. 28, 1950 |